United States Patent
Taha et al.

(10) Patent No.: US 9,891,694 B2
(45) Date of Patent: Feb. 13, 2018

(54) REDUCING POWER CONSUMPTION OF VOLATILE MEMORY VIA USE OF NON-VOLATILE MEMORY

(71) Applicant: QUALCOMM Incorporated, San Diego, CA (US)

(72) Inventors: Ali Taha, San Diego, CA (US); Vipul Gandhi, San Diego, CA (US); Phani Babu Giddi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 13/726,066

(22) Filed: Dec. 22, 2012

(65) Prior Publication Data

US 2014/0181558 A1   Jun. 26, 2014

(51) Int. Cl.
*G06F 1/32* (2006.01)
*G06F 12/02* (2006.01)

(52) U.S. Cl.
CPC .......... *G06F 1/3275* (2013.01); *G06F 1/3206* (2013.01); *G06F 12/0238* (2013.01);
(Continued)

(58) Field of Classification Search
CPC ............................ G06F 1/3275; G06F 1/3206
See application file for complete search history.

(56) References Cited

U.S. PATENT DOCUMENTS 5,909,488 A   6/1999 Koizumi et al.
6,782,472 B2  8/2004 Jain et al.
(Continued)

FOREIGN PATENT DOCUMENTS

CN   1246855 C    3/2006
EP   1703383 A1   9/2006
(Continued)

OTHER PUBLICATIONS

Shi-wu Lo, Wei-shiuan Tsai, Jeng-gang Lin, and Guan-shiung Cheng. 2010. Swap-before-hibernate: a time efficient method to suspend an OS to a flash drive. In Proceedings of the 2010 ACM Symposium on Applied Computing (SAC '10). ACM, New York, NY, USA, 201-205. DOI=10.1145/1774088.1774129 http://doi.acm.org/10.1145/1774088.1774129.*

(Continued)

*Primary Examiner* — Kim Huynh
*Assistant Examiner* — Joshua Neveln
(74) *Attorney, Agent, or Firm* — Colby Nipper/Qualcomm (57) ABSTRACT

A method includes initiating a transition from an operating mode to a sleep mode at an electronic device that includes a volatile memory and a non-volatile memory. In response to the initiating, data is copied from the volatile memory to the non-volatile memory and a portion of the volatile memory is disabled. Another method includes determining that a low performance mode condition is satisfied at an electronic device that includes a volatile memory that stores a first copy of read-only data and a non-volatile memory that stores a second copy of the read-only data. A memory mapping of the read-only data is updated from the volatile memory to the non-volatile memory. A portion of the volatile memory that stores the first copy is disabled and access of the read-only data is directed to the non-volatile memory instead of the volatile memory.

20 Claims, 7 Drawing Sheets

(52) U.S. Cl.
CPC ......... *G06F 1/3212* (2013.01); *Y02B 60/1225* (2013.01); *Y02B 60/1228* (2013.01); *Y02B 60/1292* (2013.01); *Y02B 60/32* (2013.01)

(56) References Cited

U.S. PATENT DOCUMENTS

| | | | |
|---|---|---|---|
| 7,007,180 | B2 | 2/2006 | Hashimoto |
| 7,206,230 | B2 | 4/2007 | Li et al. |
| 7,536,509 | B2 | 5/2009 | Campanale et al. |
| 7,549,066 | B2 | 6/2009 | Haid et al. |
| 7,757,060 | B2 | 7/2010 | Montero et al. |
| 7,882,299 | B2 | 2/2011 | Conley et al. |
| 8,145,925 | B2 | 3/2012 | Oh |
| 8,281,169 | B2 | 10/2012 | Borras et al. |
| 2002/0064079 | A1 | 5/2002 | Sato et al. |
| 2003/0149866 | A1 | 8/2003 | Neuman et al. |
| 2004/0027888 | A1* | 2/2004 | Kurita ........................ 365/202 |
| 2006/0242398 | A1 | 10/2006 | Fontijn et al. |
| 2007/0079147 | A1 | 4/2007 | Pyeon et al. |
| 2007/0214376 | A1 | 9/2007 | Lee et al. |
| 2009/0055408 | A1 | 2/2009 | Warren et al. |
| 2009/0119527 | A1* | 5/2009 | Kim .................. G06F 1/3203 713/323 |
| 2010/0146513 | A1 | 6/2010 | Song |
| 2011/0145609 | A1* | 6/2011 | Berard .................. G06F 1/3203 713/320 |
| 2011/0185208 | A1 | 7/2011 | Iwamoto et al. |
| 2011/0208987 | A1 | 8/2011 | Fujigaya |
| 2011/0231595 | A1 | 9/2011 | Wakrat et al. |
| 2012/0060023 | A1 | 3/2012 | Park et al. |
| 2012/0102347 | A1 | 4/2012 | Hobson |
| 2012/0254506 | A1 | 10/2012 | Sauber et al. |
| 2012/0254636 | A1 | 10/2012 | Tsukamoto et al. |
| 2012/0284475 | A1 | 11/2012 | Zaarur |

FOREIGN PATENT DOCUMENTS

| | | |
|---|---|---|
| JP | 2002170383 A | 6/2002 |
| JP | 200233933 A | 11/2002 |
| JP | 2010124243 A | 6/2010 |
| JP | 2011170730 A | 9/2011 |

OTHER PUBLICATIONS

International Search Report and Written Opinion—PCT/US2013/076827—ISA/EPO—dated Apr. 7, 2014.

* cited by examiner

REDUCING POWER CONSUMPTION OF VOLATILE MEMORY VIA USE OF NON-VOLATILE MEMORY

I. FIELD

The present disclosure is generally related to systems and methods of reducing power consumption of volatile memory via use of non-volatile memory.

II. DESCRIPTION OF RELATED ART

As portable computing devices such as mobile phones become smaller, the adverse effect of semiconductor leakage current on battery life may increase. For example, semiconductor leakage current may increase a sleep floor current of a mobile phone, where the sleep floor current represents a minimum amount of current that flows in the mobile phone while the mobile phone is in sleep mode and/or some other power-saving state such as idle mode, standby mode, etc. It is estimated that mobile phones may be in sleep mode over 95% of the time when the mobile phones are in idle standby mode. Thus, reducing the sleep floor current by even a small amount may result in a large increase in idle standby battery life.

In mobile phones that utilize dynamic random access memory (DRAM), a large portion of the sleep floor current may be due to periodic refreshing of the DRAM. One way of reducing the contribution of memory refreshes to sleep floor current is to use partial array self refresh (PASR). In PASR, data in pages of an "upper" (or "lower") half of the DRAM is migrated to the pages of a "lower" (or "upper") half of the DRAM. After page migration is completed, the "lower" (or "upper") half of the memory may be refreshed during sleep mode but the "upper" (or "lower") half of the memory may not be refreshed, which may reduce an overall amount of memory refresh current being used. However, PASR may be inconvenient if more than 50% of the DRAM was originally being utilized. When more than 50% of the DRAM is being utilized, it may not be possible to consolidate all data into one half of the DRAM without compressing the data, which may be time consuming. The excess data may be deleted or may be left to deteriorate in the unrefreshed half of the DRAM during sleep mode.

The page migration involved in PASR may also be time consuming and battery intensive (e.g., the page migration may take 10 to 40 seconds at 250 milliamps (mA)). Moreover, a reverse page migration may be performed when transitioning out of sleep mode depending on the memory allocation management in use (e.g., memory allocation management software of an operating system). Page migration may also be difficult to implement, because the location of empty pages in the DRAM may not be known until after the page migration has begun.

III. SUMMARY

Systems and methods of dynamic memory management to reduce power consumption are disclosed. The described techniques, or portions thereof, may be used during a sleep mode of an electronic device, during a normal operating mode of the electronic device, or any combination thereof.

For example, a first technique may involve utilizing non-volatile memory at an electronic device to reduce sleep floor current. To illustrate, in addition to volatile memory (e.g., RAM), a mobile phone or other electronic device may include non-volatile memory, such as NOR Flash, NAND Flash, an embedded MultiMediaCard (eMMC), etc. A portion of the non-volatile memory may be reserved or allocated for data transfer from the volatile memory. When the mobile phone transitions into sleep mode, data from the volatile memory may be transferred, in order by address, to the reserved portion of the non-volatile memory. During sleep mode, the volatile memory may be turned off, which reduces the sleep floor current by avoiding DRAM self-refreshes. When exiting sleep mode, the data may be copied back to the volatile memory in order by address from the non-volatile memory. Because the data is transferred to and from the volatile memory in order by address, memory mappings in use prior to sleep mode remain valid after exiting sleep mode. The transfer mechanism between the volatile memory and the non-volatile memory may be processor-independent (e.g., using a direct memory access (DMA) engine, a direct bus connection, etc.) or may involve a processor (e.g., each data element may pass through the processor during copying).

As another example, a second technique may involve monitoring battery life during normal (e.g., non-sleep) mode. When the battery life falls below a threshold, an electronic device may enter a low performance mode (LPM). The LPM may also be entered in response to a user command. The LPM may differ from sleep mode in that the LPM may provide continuous system operation, albeit at reduced performance. During the LPM, read-only data may be accessed from non-volatile memory instead of from the volatile memory. Upon entering the LPM, a memory mapping for the read-only data may be modified to point to a physical address in the non-volatile memory instead of a physical address in the volatile memory. To illustrate, the non-volatile memory may be a NOR Flash memory that enables execute-in-place (XIP) operation for executing stored code. During the LPM, self-refreshes of volatile memory portions that store the read-only data may be disabled, because the read-only data is being accessed from the non-volatile memory instead. Alternately, the volatile memory portions thereof may be turned off altogether during the LPM.

In a particular embodiment, a method includes initiating a transition from an operating mode to a sleep mode at an electronic device. The electronic device includes a volatile memory device having a first size and a non-volatile memory device having a second size that is greater than or equal to the first size. The method also includes, in response to the initiating, copying data from the volatile memory device to the non-volatile memory device. The method further includes disabling the volatile memory device during the sleep mode.

In another particular embodiment, an apparatus includes a volatile memory device having a first size and a non-volatile memory device having a second size that is greater than or equal to the first size. The apparatus also includes a processor configured to initiate a transition from an operating mode to a sleep mode and to disable the volatile memory device during the sleep mode. The apparatus further includes a data transfer module configured to copy data from the volatile memory device to the non-volatile memory device in response to the initiating and prior to the disabling of the volatile memory device during the sleep mode.

In another particular embodiment, a computer-readable storage device includes instructions that, when executed by a processor, cause the processor to initiate a transition from an operating mode to a sleep mode at an electronic device. The electronic device includes a volatile memory device having a first size and a non-volatile memory device having a second size that is greater than or equal to the first size. The instructions, when executed by the processor, also cause the processor to, in response to the initiating, cause copying of data from the volatile memory device to the non-volatile memory device. The instructions, when executed by the processor, further cause the processor to disable the volatile memory device during the sleep mode.

In another particular embodiment, an apparatus includes a volatile memory device having a first size and a non-volatile memory device having a second size that is greater than or equal to the first size. The apparatus also includes a processor configured to initiate a transition from an operating mode to a sleep mode and to disable the volatile memory device during the sleep mode. The apparatus further includes means for copying data from the volatile memory device to the non-volatile memory device in response to the initiating and prior to the disabling of the volatile memory device during the sleep mode.

In another particular embodiment, a method includes determining that a low performance mode (LPM) condition is satisfied at an electronic device. The electronic device includes a volatile memory device that stores a first copy of read-only data and a non-volatile memory device that stores a second copy of the read-only data. The method also includes, in response to the LPM condition being satisfied, updating a memory mapping of the read-only data from the volatile memory device to the non-volatile memory device. The method further includes disabling a portion of the volatile memory device that stores the first copy of the read-only data and directing an access request for the read-only data to the non-volatile memory device instead of to the volatile memory device.

In another particular embodiment, an apparatus includes a volatile memory device storing a first copy of read-only data and a non-volatile memory device storing a second copy of the read-only data. The apparatus also includes a processor configured to, in response to a LPM condition being satisfied, update a memory mapping of the read-only data from the volatile memory device to the non-volatile memory device. The processor is further configured to disable a portion of the volatile memory device that stores the first copy of the read-only data and to direct an access request for the read-only data to the non-volatile memory device instead of to the volatile memory device.

In another particular embodiment, a computer-readable storage device includes instructions that, when executed by a processor, cause the processor to, in response to a LPM condition being satisfied, update a memory mapping of read-only data from a volatile memory device to a non-volatile memory device. The LPM condition is satisfied at an electronic device that includes the volatile memory device storing a first copy of the read-only data and the non-volatile memory device storing a second copy of the read-only data. The instructions, when executed by the processor, further cause the processor to disable a portion of the volatile memory device that stores the first copy of the read-only data and to direct an access request for the read-only data to the non-volatile memory device instead of to the volatile memory device.

In another particular embodiment, an apparatus includes a volatile memory device storing a first copy of read-only data and a non-volatile memory device storing a second copy of the read-only data. The apparatus also includes means for updating, in response to a LPM condition being satisfied, a memory mapping of the read-only data from the volatile memory device to the non-volatile memory device. The apparatus further includes means for disabling a portion of the volatile memory device that stores the first copy of the read-only data and means for directing an access request for the read-only data to the non-volatile memory device instead of to the volatile memory device.

One particular advantage provided by at least one of the disclosed embodiments is an ability to decrease sleep floor current by disabling volatile memory, or a portion thereof, after copying data from the volatile memory to non-volatile memory in response to a transition to sleep mode. Another particular advantage is an ability to decrease memory refresh current by accessing read-only data from non-volatile memory instead of from volatile memory. Other aspects, advantages, and features of the present disclosure will become apparent after review of the entire application, including the following sections: Brief Description of the Drawings, Detailed Description, and the Claims.

V. DETAILED DESCRIPTION

Figure 1:
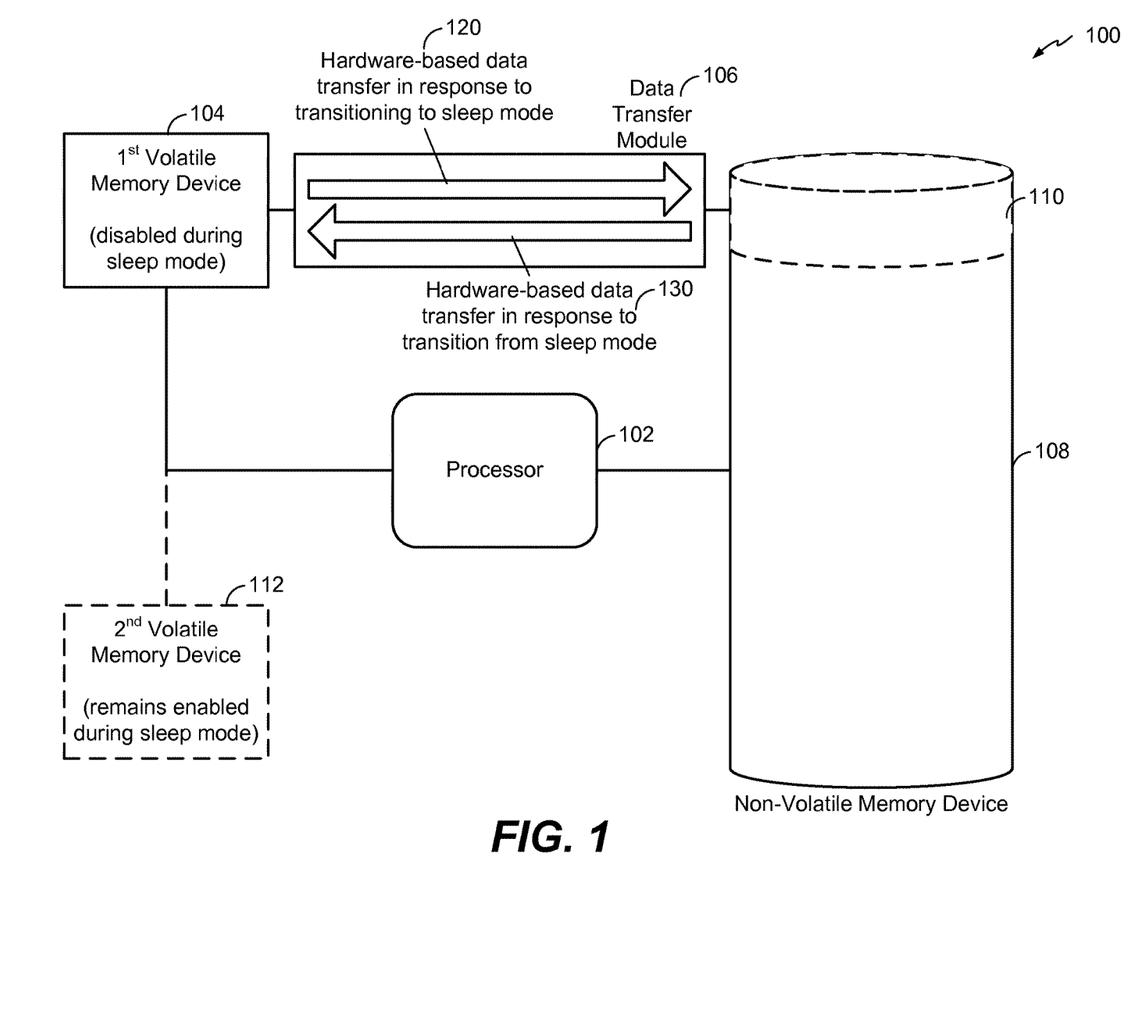
FIG. 1 is a diagram to illustrate a particular embodiment of a system that is operable to reduce power consumption of volatile memory by disabling the volatile memory, or a portion thereof, after processor-independent data transfer from the volatile memory to non-volatile memory.

FIG. 1 is a diagram to illustrate a particular embodiment of a system 100 of reducing power consumption of volatile memory by disabling the volatile memory, or a portion thereof, after processor-independent data transfer from the volatile memory to non-volatile memory. The system 100 may include a processor 102 that is coupled to a first volatile memory device 104 and the system 100 may include, or be coupled to, a non-volatile memory device 108. In a particular embodiment, the system 100 of FIG. 1 may be included within an electronic device, such as a mobile phone, a tablet computing device, a laptop computing device, etc.

In a particular embodiment, the first volatile memory device 104 includes random access memory (RAM). For example, the first volatile memory device 104 may be a dynamic random access memory (DRAM) device, such as a single-rank or dual-rank double data rate (DDR) synchronous DRAM device (also referred to herein as a "DDR"). When the first volatile memory device 104 includes DRAM, the first volatile memory device 104 may consume power (e.g., battery power) to refresh and maintain the data stored in the DRAM, even when the system 100 is in an inactive or sleep mode. However, as further described herein, power consumption of the first volatile memory device 104 may be reduced via techniques that involve disabling the first volatile memory device 104, or a portion thereof, after transferring data from the first volatile memory device 104 to the non-volatile memory device 108.

The non-volatile memory device 108 may include a disk-based memory, a flash memory, a solid state memory, or some other type of non-volatile memory. For example, the non-volatile memory device 108 may include NOR flash memory, NAND flash memory, an embedded MultiMediaCard (eMMC), or any combination thereof. In a particular embodiment, a portion 110 of the non-volatile memory device 108 may be reserved or allocated for data transfers from volatile memory in the system 100, such as from the first volatile memory device 104. Thus, less than an entire capacity of the non-volatile memory device 108 is available for general storage (e.g., storage of application/user data). However, because the non-volatile memory device 108 may be substantially larger than the volatile memory device 104, reserving the portion 110 for data transfer may not have a noticeable impact on performance or user experience.

In a particular embodiment, a size of the reserved portion 110 is equal to a capacity of the first volatile memory device 104 or a fraction of the capacity of the first volatile memory device 104. For example, the non-volatile memory device 108 may be a 16 gigabyte (GB) eMMC and the first volatile memory device 104 may be a 512 megabyte (MB) DDR. Thus, 512 MB or 256 MB, as an example, of the eMMC may be reserved for transfer of data from the DDR. When multiple DDRs are present, the size of the reserved portion 110 may be equal to the capacity or a fraction of the capacity of one of the DDRs, a sum of the capacities or fractions of the capacities of more than one but not all of the DDRs, or a sum of the capacities or fractions of the capacities of all of the DDRs.

As shown in FIG. 1, data transfer between the first volatile memory device 104 and the non-volatile memory device 108 may be performed independent of the processor 102 (e.g., without sending the transferred data to the processor 102). For example, a data transfer module 106 may be coupled to the first volatile memory device 104 and to the non-volatile memory device 108. To illustrate, the data transfer module 106 may include hardware such as a direct memory access (DMA) engine or controller, a direct data bus connection, etc. that is configured to copy data from the first volatile memory device 104 to the non-volatile memory device 108, and vice versa.

In a particular embodiment, using the data transfer module 106 to transfer data without sending the data to the processor 102 enables low-power high-speed transfer of the data. For example, the data transfer module 106 may transfer the entire contents of a 512 MB DDR (or a fraction of the contents of a 512 MB DDR) in less than a second while the processor 102 is power-collapsed (e.g., in sleep mode). Once the entire contents or a portion of the contents of the first volatile memory device 104 are copied to the non-volatile memory device 108, the first volatile memory device 104 or a portion of the first volatile memory device 104 may be disabled during sleep mode. For example, disabling the first volatile memory device 104 or a portion of the first volatile memory device 104 may include turning off the first volatile memory device 104 or turning off the corresponding portion of the first volatile memory device 104, disabling refreshing of the first volatile memory device 104 or disabling refreshing of the corresponding portion of the first volatile memory device 104, or any combination thereof. When the system 100 exits from sleep mode, the data transfer module 106 may be used to copy the data from the non-volatile memory device 108 back to the first volatile memory device 104.

In a particular embodiment, data is copied between the first volatile memory device 104 and the non-volatile memory device 108 in order by address. As used herein, copying data "in order by address" means that each element of data that is copied from a volatile memory device is written back to the volatile memory device in the same location it was copied from prior to disabling the volatile memory device. For example, a data image (e.g., snapshot) of the entire first volatile memory device 104 (e.g., a 512 MB data image) may be copied to the non-volatile memory device 108, regardless of whether or not the entire DDR first volatile memory device 104 was storing active data (e.g., data that is in use by a hardware component and/or software application at the system 100). Generating and copying a data image of the entire first volatile memory device 104 may be faster than compressing data or locating and copying only the active data to the non-volatile memory device 108. Moreover, because the size of the non-volatile memory device 108 may be significantly larger than the size of the first volatile memory device 104, the storage cost of copying a snapshot of the entire first volatile memory device 104 may be relatively small and acceptable to a user. In addition, because the data is transferred to and from the first volatile memory device 104 in order by address, memory mappings (e.g., virtual address to physical address mappings) in use prior to sleep mode may remain valid after exiting sleep mode. Further, unlike partial array self refresh (PASR) systems, data loss may be avoided when the first volatile memory device 104 is more than 50% full.

During operation, a transition from a normal or active operating mode to a sleep mode may be initiated. For example, the processor 102, or some other component (e.g., a power controller), may initiate the transition to sleep mode based on user input (e.g., a user depressing a power or standby button of an electronic device) or based on an event or interrupt (e.g., a timeout). In response to the initiation of the transition to the sleep mode, the data transfer module 106 may copy data from the first volatile memory device 104 to the non-volatile memory device 108, as shown at 120. In a particular embodiment, the processor 102 sends a message to the data transfer module 106 to trigger the copying.

After the data has been copied, the first volatile memory device 104 may be disabled. For example, power to the first volatile memory device 104 may be turned off (e.g., by de-asserting an enable signal or power signal) and/or refreshing of the first volatile memory device 104 may be stopped (e.g., by de-asserting a refresh signal or setting a configuration value in a register or other memory associated with the first volatile memory device 104). In a particular embodiment, the processor 102, or some other component (e.g., a power controller), may disable the first volatile memory device 104. Thus, the first volatile memory device 104 may consume less power in sleep mode as compared to existing systems that refresh DRAM devices during sleep mode. Other components of the system 100, such as the processor 102 and/or the non-volatile memory device 108, may also be disabled during the sleep mode. In response to a transition from the sleep mode back to the normal or active operating mode, the first volatile memory device 104 is enabled and the data stored in the non-volatile memory device 108 is copied back to the first volatile memory device 104 from the non-volatile memory device 108, as shown at 130.

In a particular embodiment, additional volatile memory devices may also be present in the system 100. For example, a second volatile memory device 112 may be coupled to the processor 102. Alternately, the volatile memory devices 104, 112 may be different ranks of a multi-rank DDR. For example, the first volatile memory device 104 may be a 512 MB lower rank of a 1 GB DDR and the second volatile memory device 112 may be a 512 MB upper rank of the 1 GB DDR. Additional non-volatile memory devices and/or processors may also be present in the system 100. Thus, the number, configuration, capacity, and type of the various devices described herein should be considered merely illustrative, and not limiting. When multiple volatile memory devices are present (or a multi-rank volatile memory device is present), data from any number of the volatile memory devices (or ranks) may be transferred to the non-volatile memory device 108 in response to initiation of sleep mode.

For example, if a mobile phone includes two DDRs (or a dual-rank DDR), one DDR (or rank) may be dedicated to multimedia applications/data and the other DDR (or rank) may be dedicated to modem applications/data and other "critical" data. In that case, data from the multimedia DDR (or rank) may be copied to non-volatile memory and the multimedia DDR (or rank) may be disabled during sleep mode to conserve power. However, modem applications/data may remain in the modem DDR (or rank), and the modem DDR (or rank) may continue to perform self-refreshes during sleep mode. Maintaining modem data and other critical data in the modem DDR (or rank) during the sleep mode may enable the mobile phone to more quickly respond to wireless cycles, such as paging cycles. In some embodiments, certain application or user interface (UI) data, such as a mobile phone unlock screen, may be maintained in the modem DDR (or rank) so that the mobile phone is responsive to user input when exiting the sleep mode, which may improve user experience.

It will be appreciated that other memory configurations may benefit from the system 100 of FIG. 1. For example, the entire contents of a multimedia memory and a non-critical portion (e.g., a lower rank) of a modem memory may be transferred to disk while a critical portion (e.g., an upper rank) of the modem memory may continue to be refreshed in sleep mode.

In a particular embodiment, the system 100 of FIG. 1 may support selective prioritization of certain data stored in volatile memory. For example, application developers (e.g., via an application programming interface (API), a compiler, a linker, etc.) or users (e.g., via graphical user interface (GUI) options) may be able to specify whether an allocation of dynamic memory (e.g., requested by an application or an operating system) or loading of data (e.g., requested by an application or an operating system) should take place in higher-priority volatile memory that will remain enabled during sleep mode or in lower-priority volatile memory that will be disabled during sleep mode after data is transferred to a non-volatile memory.

The system 100 of FIG. 1 may thus reduce sleep floor current by copying data from volatile memory to non-volatile memory and disabling the volatile memory, or a portion thereof, during sleep mode, thereby avoiding power-consuming self-refresh operations on the volatile memory. Advantageously, the data transfer operation may be less computation and power intensive than page migrations associated with PASR. For example, the data transfer operation may be performed using dedicated hardware (e.g., the data transfer module 106). Further, the system 100 of FIG. 1 may enable dynamic memory management to balance power reduction with performance. For example, less critical data from one DDR (or rank) may be copied to non-volatile memory so that the DDR (or rank) can be disabled during sleep mode, but more critical data may be maintained in another DDR (or rank) during the sleep mode to improve responsiveness and performance during/after sleep mode.

Figure 2:
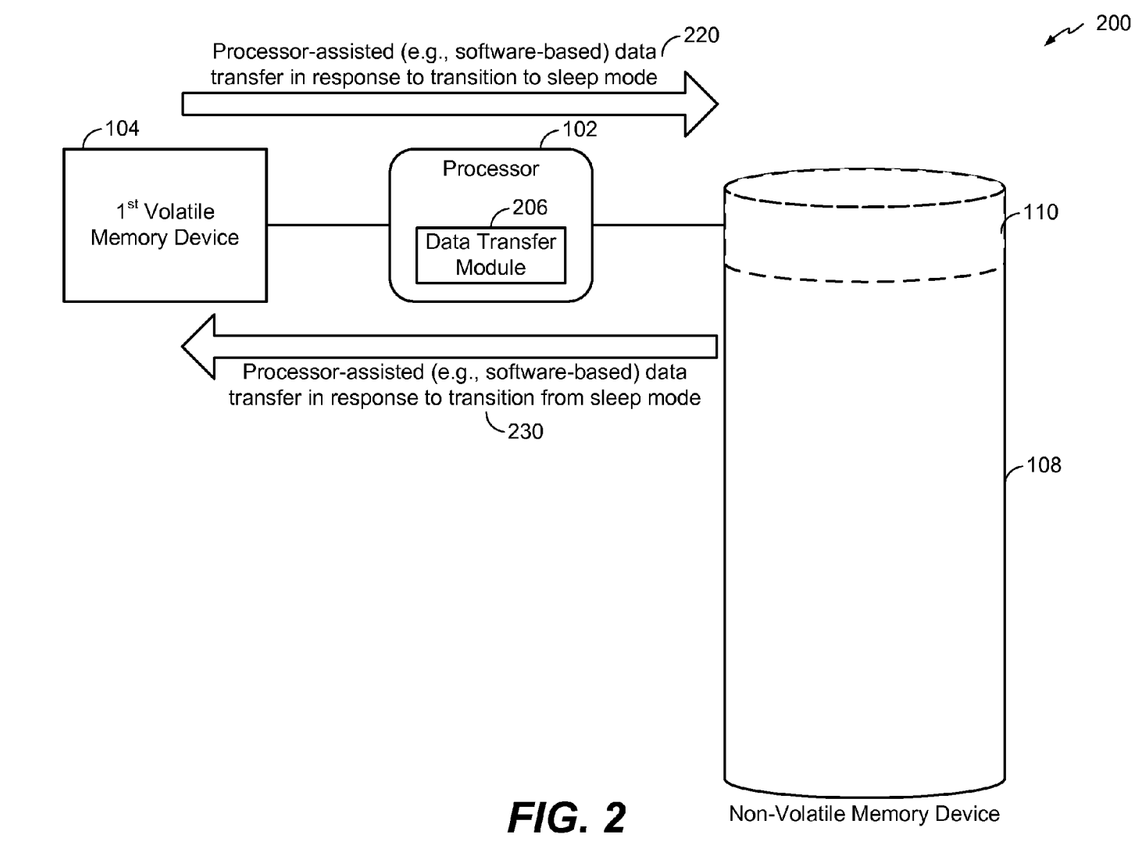
FIG. 2 is a diagram to illustrate a particular embodiment of a system that is operable to reduce power consumption of volatile memory by disabling the volatile memory, or a portion thereof, after processor-dependent data transfer from the volatile memory to non-volatile memory.

FIG. 2 is a diagram to illustrate a particular embodiment of a system 200 of reducing power consumption of volatile memory by disabling the volatile memory, or a portion thereof, after processor-dependent data transfer from the volatile memory to non-volatile memory. The system 200 may include the processor 102, the first volatile memory device 104, and the non-volatile memory device 108 including the portion 110 reserved for data transfers from the first volatile memory device 104.

FIG. 2 illustrates a data transfer module 206 within the processor 102. For example, the data transfer module 206 may be implemented using hardware integrated into the processor 102 and/or instructions executable by the processor 102. The data transfer module 206 may be configured to transfer data between the first volatile memory device 104 and the non-volatile memory device 108 via the processor 102.

For example, in response to initiation of a transition to sleep mode, the data transfer module 206 may perform processor-assisted (e.g., software-based) copying of a data image (e.g., snapshot) from the first volatile memory device 104 to the reserved portion 110 of the non-volatile memory device 108, as shown at 220. As another example, in response to a transition out of the sleep mode, the data transfer module 206 may perform processor-assisted (e.g., software-based) copying of the data image (e.g., snapshot) from the reserved portion of the non-volatile memory device 108 to the first volatile memory device 104, as shown at 230.

FIG. 2 thus illustrates an alternative data transfer mechanism to that illustrated in FIG. 1. Whereas the hardware-based processor-independent mechanism of FIG. 1 may perform data transfer faster, the processor-assisted (e.g., software-based) mechanism of FIG. 2 may be implemented in existing electronic devices without introducing additional hardware elements that may increase a cost of manufacturing.

Figure 3:
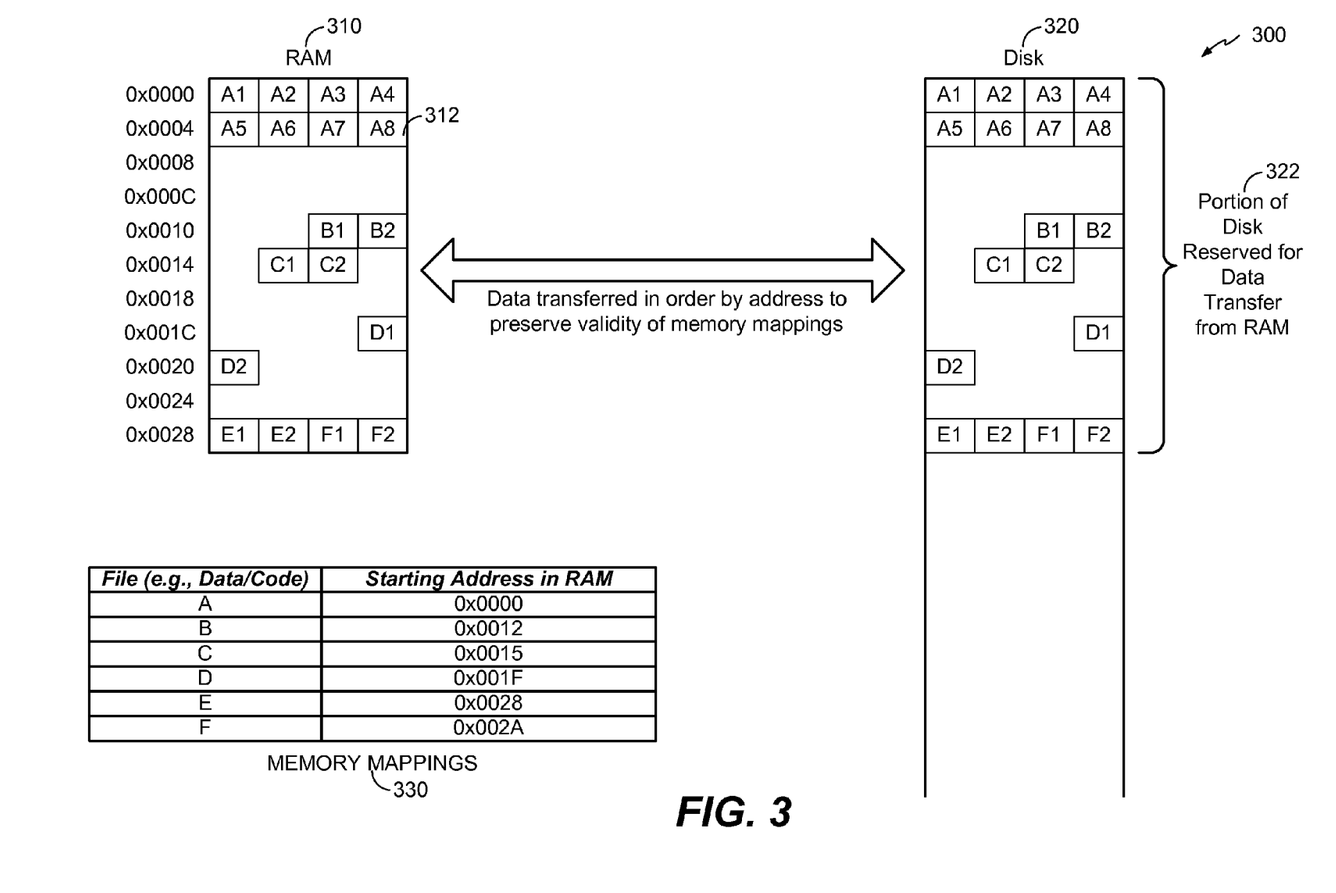
FIG. 3 is a diagram to illustrate a particular embodiment of the data transfer operations of FIGS. 1-2.

FIG. 3 illustrates a particular embodiment of the data transfer operations of FIGS. 1-2, and is generally designated 300. FIG. 3 illustrates a RAM 310 and a disk 320. For example, the RAM 310 may be the first volatile memory device 104 of FIGS. 1-2 or the second volatile memory device 112 of FIG. 1. The disk 320 may be the non-volatile memory device 108 of FIGS. 1-2.

As described with reference to FIGS. 1-2, data transfer between the RAM 310 and the disk 320 may be performed in order by address. Prior to the data transfer, memory mappings 330 may be in use and the RAM 310 may store five files (e.g., data files or code files), labeled A-F. Each of the files may include one or more portions (e.g., pages), as shown. For example, the file A may include eight portions and the file B-F may each include two portions. The memory mappings 330 may indicate a starting address of each of the files. For example, the starting address of the file A may be 0x0000 and the starting address of the file D may be 0x001F, as shown.

In response to initiation of a transition to sleep mode, a data image (e.g., snapshot) of the RAM 310 may be copied to a reserved portion 322 of the disk 320. As illustrated in FIG. 3, each portion of each file may be copied to a corresponding location on the disk, and the relative ordering and placement of the portions of the files is maintained. In response to a transition out of the sleep mode, the data image may be copied back to the RAM 310. Thus, the memory mappings 330 that were in use prior to sleep mode may remain valid after exiting the sleep mode. For example, the eighth portion 312 of the file A may continue to be located at the address 0x0007, as shown.

It will be appreciated that copying data in order by address (e.g., without compression and/or relocation) and preserving memory mappings, as shown in FIG. 3, may simplify memory management and reduce preparation/clean-up operations associated with the systems of FIGS. 1-2.

Figure 4:
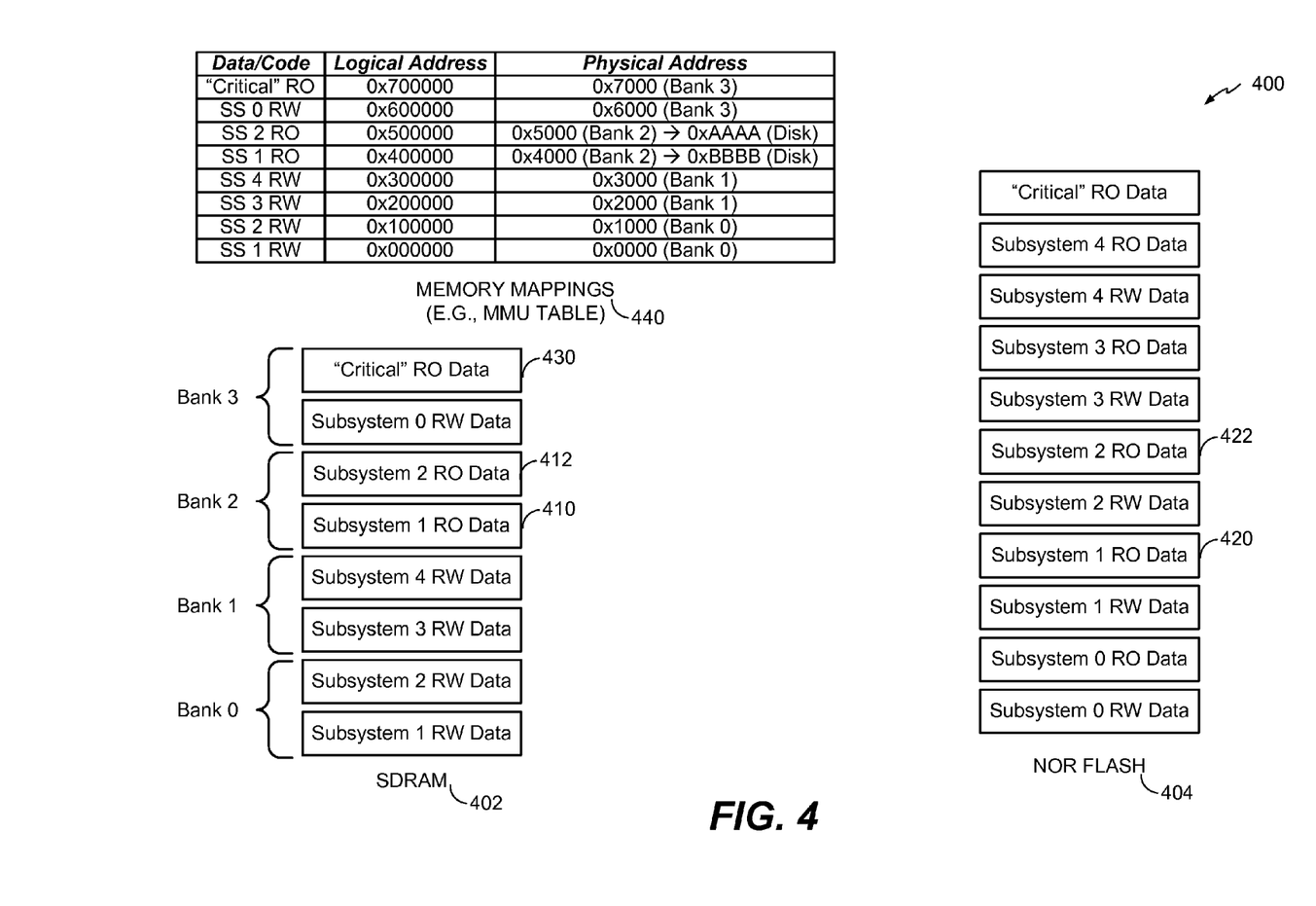
FIG. 4 is a diagram to illustrate a particular embodiment of a system that is operable to reduce power consumption of volatile memory with respect to read-only data.

FIG. 4 is a diagram to illustrate a particular embodiment of a system 400 that is operable to reduce power consumption of volatile memory with respect to read-only data. Whereas FIGS. 1-3 illustrate techniques to reduce sleep floor current while an electronic device is in sleep mode, FIG. 4 illustrates a technique that may be applied during a "normal" (e.g., active) operating mode. The system 400 includes a volatile memory device (e.g., a synchronous DRAM (SDRAM) 402) and a non-volatile memory device (e.g., a NOR flash memory 404). In the embodiment of FIG. 4, the SDRAM 402 has four banks (banks 0-3). Power control for each bank may be independent, as further described herein.

During operation, a copy of one or more segments of data stored in the NOR flash memory 404 may be loaded into the SDRAM 402. For example, when a particular application is executing, data associated with the application may be loaded into the SDRAM 402 for quicker access. Generally, data associated with an electronic device may be divided into two categories—read-only ("RO") data and read-write ("RW") data. Read-only data is not modifiable (e.g., subject to read requests but not write requests), whereas read-write data is modifiable (e.g., subject to both read requests and write requests). Each application and subsystem (e.g., subsystem of an operating system) at the electronic device may include or be associated with read-only data and read-write data. For example, as shown in FIG. 4, the NOR flash memory 404 may store read-only data and read-write data associated with Subsystem 0, Subsystem 1, Subsystem 2, Subsystem 3, and Subsystem 4. The NOR flash memory 404 may also store "critical" read-only data (e.g., read-only data for a modem in the case of a wireless phone).

As shown in FIG. 4, copies of various read-only and read-write data may be loaded in the SDRAM 402. For example, a first copy 410 of the Subsystem 1 read-only data and a first copy 412 of the Subsystem 2 read-only data may be stored in the SDRAM 402. A second copy 420 of the Subsystem 1 read-only data and a second copy 422 of the Subsystem 2 read-only data may be stored in the NOR flash memory 404. When data is being accessed from the SDRAM 402, a memory mapping for the data may identify the SDRAM 402. For example, as shown in the memory mappings 440 (e.g., a memory management unit (MMU) table), "critical" read-only data 430 may be accessed from a physical address located in bank 3 of the SDRAM.

During operation, the electronic device may monitor battery life. When the battery life falls below a threshold (e.g., 10%), the electronic device may enter a low performance mode (LPM). Alternately, or in addition, the LPM may be entered in response to a user command or user input requesting a transition to the LPM. The LPM may differ from sleep mode in that the LPM may provide continuous system operation, albeit at reduced performance.

In response to an LPM condition (e.g., battery life being less than or equal to 10%) being satisfied, a memory mapping of read-only data may be updated from the SDRAM 402 to the NOR flash memory 404. For example, as shown in the memory mappings 440, mappings for the Subsystem 1 read-only data and the Subsystem 2 read-only data may be updated to point to physical addresses in the NOR flash memory 404 instead of bank 2 of the SDRAM 402. A portion of the SDRAM 402 that stores the read-only data may be disabled, and access requests (e.g., read requests) for the read-only data during the LPM may be directed to the NOR flash memory 404 instead of to the SDRAM 402. For example, bank 2 of the SDRAM 402 may be disabled, and during the LPM access requests to read Subsystem 1 read-only data and Subsystem 2 read-only data may be directed to the NOR flash memory 404, in accordance with the updated memory mappings 440.

In a particular embodiment, disabling bank 2 of the SDRAM 402 during the LPM may include turning off bank 2 during the LPM (e.g., by de-asserting an enable signal or power signal) or disabling refreshing of bank 2 during the LPM (e.g., by de-asserting a refresh signal or setting a configuration value in a register). It will be appreciated that disabling a portion of the SDRAM 402 (or the entire SDRAM 402) during the LPM may reduce power consumption. Copies of read-write data and other read-only data (e.g., the "critical" read-only data 430) may continue to be accessed from the SDRAM 402 during the LPM.

In response to a determination that the LPM condition is no longer satisfied (e.g., battery life exceeds 10%), bank 2 of the SDRAM 402 may be enabled and the memory mappings 440 for the read-only data stored in bank 2 of the SDRAM 402 may be updated to point to bank 2 of the SDRAM 402 instead of to the NOR flash memory 404. Because the copy of the read-only data in the SDRAM 402 may have degraded during the LPM, a new copy of the read-only data may be loaded to the SDRAM 402 prior to updating the memory mappings 440.

In a particular embodiment, as shown in FIG. 4, non-volatile memory in the system 400 may include NOR flash memory 404. The NOR flash memory 404 may enable execute-in-place (XIP) operation for executing stored code. Thus, instructions corresponding to read-only code may be executed from the NOR flash memory 404 during the LPM without use of the SDRAM 402.

In a particular embodiment, additional operations may be performed (e.g., by an operating system or a controller) when transitioning into the LPM (e.g., prior to updating the memory mappings 440 to point to the NOR flash memory 404). For example, interrupts may be disabled, thread scheduling at a processor may be suspended, the processor may be switched from multi-threaded mode to single-threaded mode, and/or translation lookaside buffer (TLB) entries may be invalidated. Additional operations may also be performed (e.g., by an operating system or a controller) when transitioning out of the LPM (e.g., after updating the memory mappings 440 to point to the SDRAM 402). For example, interrupts may be enabled, thread scheduling may be resumed at the processor, and the processor may be switched from single-threaded mode to multi-threaded mode.

In a particular embodiment, to support implementation of the LPM, subsystems (e.g., a modem subsystem, a graphics subsystem, an audio subsystem, etc.) of an electronic device may separate read-only data from read-write data. For example, a linker used to create images corresponding to the subsystems may group read-only data separately from read-write data.

In a particular embodiment, certain read-only data may continue to reside in and be accessed from the SDRAM 402 during the LPM. For example, the "critical" read-only data 430 may continue to be accessed from the SDRAM 402 during the LPM. Maintaining the "critical" read-only data 430 in an accessible state in the SDRAM 402 during the LPM may enable the system 400 to perform operations associated with the "critical" read-only data 430 in a shorter amount of time. For example, when the "critical" read-only data 430 includes modem data, the system 400 of FIG. 4 may be able to quickly respond to paging cycles while in the LPM. The system 400 of FIG. 4 may thus support selective prioritization of certain read-only data. For example, application developers (e.g., via an application programming interface (API), a compiler, a linker, etc.) or users (e.g., via graphical user interface (GUI) options) may be able to specify whether particular read-only data should continue to be accessed from volatile memory (e.g., the SDRAM 402) during the LPM.

The system 400 of FIG. 4 may thus reduce power consumption in non-sleep (e.g., active) operating modes by accessing certain read-only data from non-volatile memory instead of volatile memory during low-power conditions. At least a portion of the volatile memory that stored the read-only data may be disabled, thereby avoiding power-consuming self-refresh operations on the portion of the volatile memory.

Figure 5:
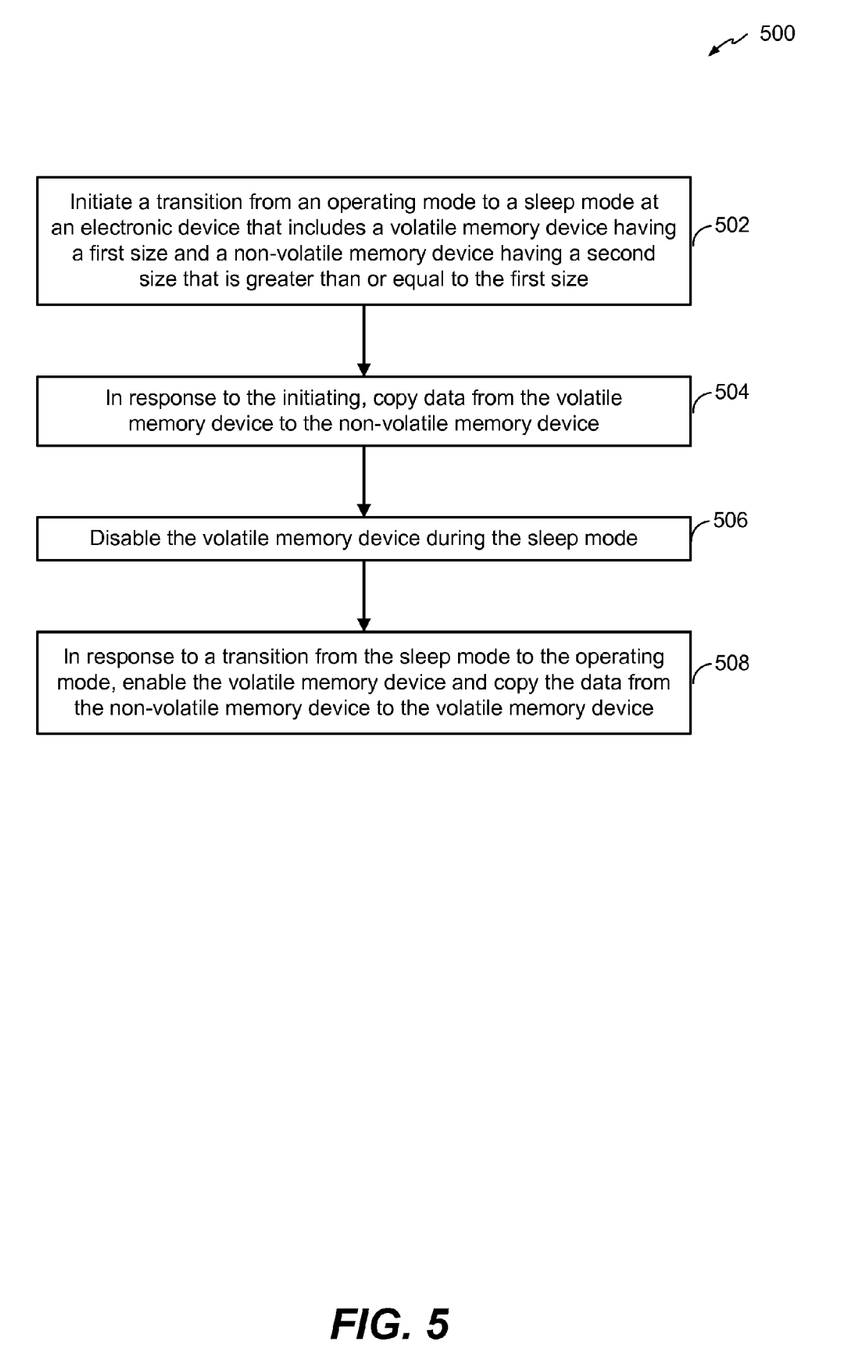
FIG. 5 is a flowchart to illustrate a particular embodiment of a method of operation at the systems of FIGS. 1-2.

FIG. 5 is a flowchart to illustrate a particular embodiment of a method 500 of operation that may be performed at the systems of FIGS. 1-2.

The method 500 includes initiating a transition from an operating mode to a sleep mode at an electronic device, at 502. The electronic device may include a volatile memory device having a first size and a non-volatile memory device having a second size that is greater than or equal to the first size. For example, referring to FIG. 1 or FIG. 2, the processor 102 may initiate a transition to sleep mode at an electronic device that includes the first volatile memory device 104 and the non-volatile memory device 108.

The method 500 also includes, in response to the initiating, copying data from the volatile memory device to the non-volatile memory device, at 504. For example, referring to FIG. 1, the data transfer module 106 may perform processor-independent copying of data from the first volatile memory device 104 to the non-volatile memory device 108. As another example, referring to FIG. 2, the data transfer module 206 may perform processor-assisted copying of data from the first volatile memory device 104 to the non-volatile memory device 108. In a particular embodiment, the data may be copied in order by address, as described with reference to FIG. 3.

The method 500 further includes disabling the volatile memory device during the sleep mode, at 506. For example, referring to FIG. 1 or FIG. 2, the processor 102 may disable the first volatile memory device 104. The method 500 also includes, in response to a transition from the sleep mode to the operating mode, enabling the volatile memory device and copying the data from the non-volatile memory device to the volatile memory device, at 508. For example, referring to FIG. 1, the data transfer module 106 may perform processor-independent copying of the data from the non-volatile memory device 108 to the first volatile memory device 104. As another example, referring to FIG. 2, the data transfer module 206 may perform processor-assisted copying of the data from the non-volatile memory device 108 to the first volatile memory device 104.

The method 500 of FIG. 5 may thus be used to reduce sleep floor current by copying data from volatile memory to non-volatile memory and disabling all or a portion of the volatile memory during sleep mode, thereby avoiding or reducing power-consuming self-refresh operations on the volatile memory, respectively.

Figure 6:
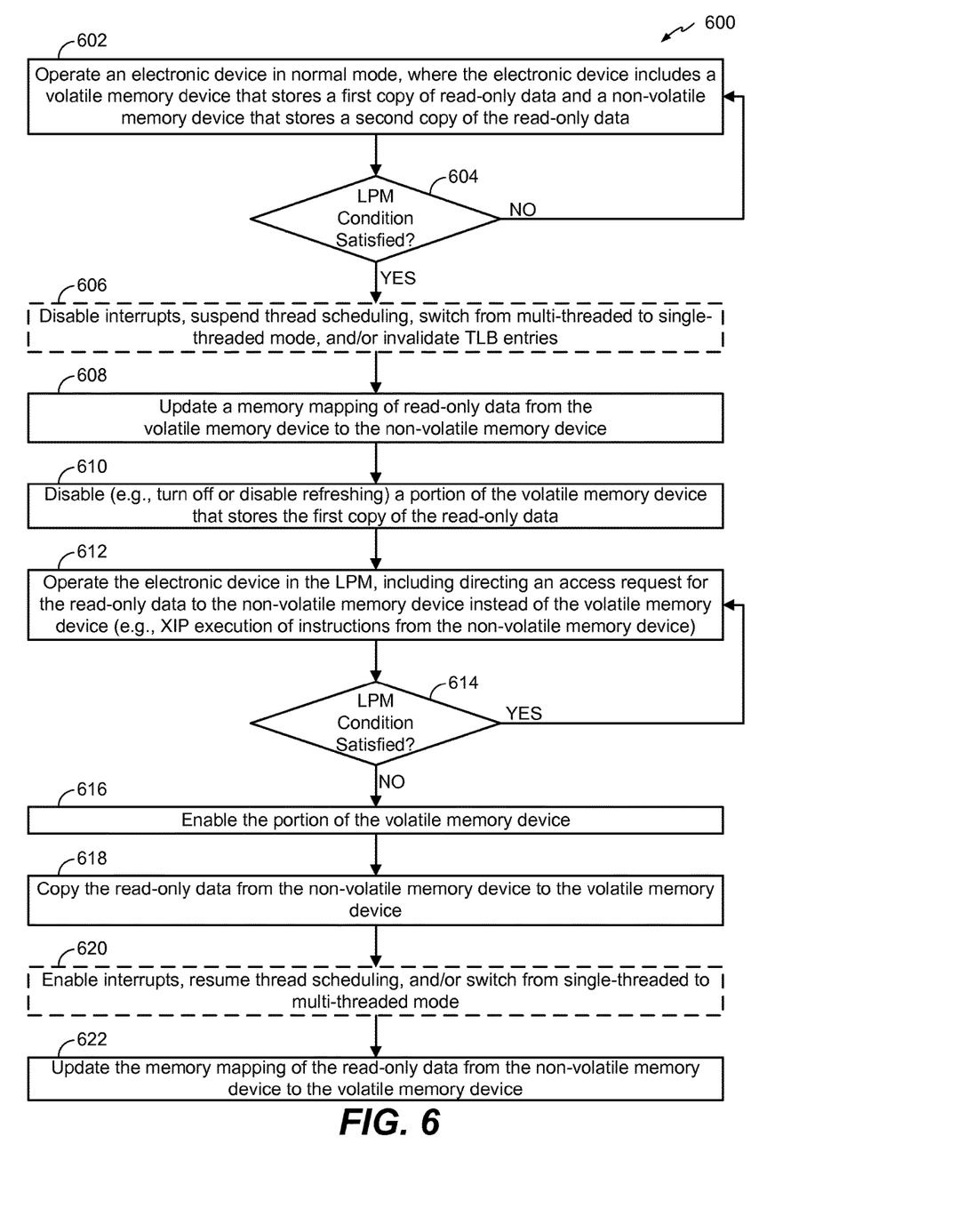
FIG. 6 is a flowchart to illustrate a particular embodiment of a method of operation at the system of FIG. 4.

FIG. 6 is a flowchart to illustrate a particular embodiment of a method 600 of operation that may be performed at the system of FIG. 4.

The method 600 includes operating an electronic device in normal mode, at 602. The electronic device may include a volatile memory device that stores a first copy of read-only data and a non-volatile memory device that stores a second copy of the read-only data. For example, in FIG. 4, the SDRAM 402 stores the first copy 410 of the Subsystem 1 read-only data and the NOR flash memory 404 stores the second copy 420 of the subsystem 1 read-only data.

The method 600 also includes determining whether a LPM condition is satisfied, at 604. For example, the LPM condition may be satisfied in response to user input and/or when the remaining battery life of the electronic device is below a threshold (e.g., 10%). While the LPM condition is not satisfied, the method 600 returns to 602 and the electronic device continues operating in the normal mode while monitoring battery life.

When the LPM condition is satisfied, the method 600 may optionally include disabling interrupts, suspending thread scheduling, switching from multi-threaded to single-threaded mode, and/or invalidating TLB entries, at 606. The method 600 also includes updating a memory mapping of read-only data from the volatile memory device to the non-volatile memory device, at 608. For example, in the memory mappings 440 of FIG. 4, the mapping for the Subsystem 1 read-only data may be updated from 0x4000 (i.e., an address in bank 2 of the SDRAM 402) to 0xBBBB (i.e., an address in the NOR flash memory 404).

The method 600 further includes disabling (e.g., turning off or disabling refreshing of) a portion of the volatile memory device that stores the first copy of the read-only data, at 610, and operating the electronic device in the LPM, at 612. Operating the electronic device in the LPM may include directing an access request for the read-only data to the non-volatile memory device instead of to the volatile memory device. In a particular embodiment, the non-volatile memory device includes NOR flash memory and XIP execution of instructions may be performed from the NOR flash memory. To illustrate, the NOR flash memory may support XIP execution by providing a processor-like memory interface and addressing of individual words stored in the NOR flash memory. For example, referring to FIG. 4, bank 2 of the SDRAM 402 may be disabled and the second copy 420 of the Subsystem 1 read-only data may be accessed during the LPM in accordance with the updated memory mappings 440.

During the LPM, the method 600 includes determining whether the LPM condition continues to be satisfied, at 614. When the LPM condition is satisfied, the method 600 returns to 612 and the electronic device continues to operate in the LPM. When the LPM condition is no longer satisfied (e.g., battery life is greater than 10% or a user requests to exit the LPM), the method 600 includes enabling the portion of the volatile memory device, at 616, and copying the read-only data from the non-volatile memory device to the volatile memory device, at 618. For example, in FIG. 4, bank 2 of the SDRAM 402 may be enabled and the Subsystem 1 read-only data may be copied to the SDRAM 402.

The method 600 may optionally include enabling interrupts, resuming thread scheduling, and/or switching from single-threaded to multi-threaded mode, at 620. The method 600 further includes updating the memory mapping of the read-only data from the non-volatile memory device to the volatile memory device, at 622. For example, in FIG. 4, the memory mapping of the Subsystem 1 read-only data may be updated from 0xBBBB back to 0x4000.

The method 600 of FIG. 6 may thus be used to reduce power consumption by accessing read-only data from non-volatile memory instead of from volatile memory during low-power conditions. At least a portion of the volatile memory that stored the read-only data may be disabled, thereby avoiding power-consuming self-refresh operations on the portion of the volatile memory.

It should be noted that although FIGS. 1-3 and 5 describe a sleep mode technique and FIGS. 4 and 6 describe a normal mode technique, this organization is for ease of explanation only. In accordance with the disclosure, an electronic device (e.g., a mobile phone) may implement all or a portion of either or both of the described techniques. For example, referring to FIG. 7, a block diagram of an electronic device 700 including components operable to implement both techniques is shown. In a particular embodiment, the electronic device 700, or components thereof, may be included in a mobile phone, a set-top box, a music player, a video player, an entertainment unit, a navigation device, a communications device, a personal digital assistant (PDA), a fixed location data unit, a computing device, or any combination thereof.

Figure 7:
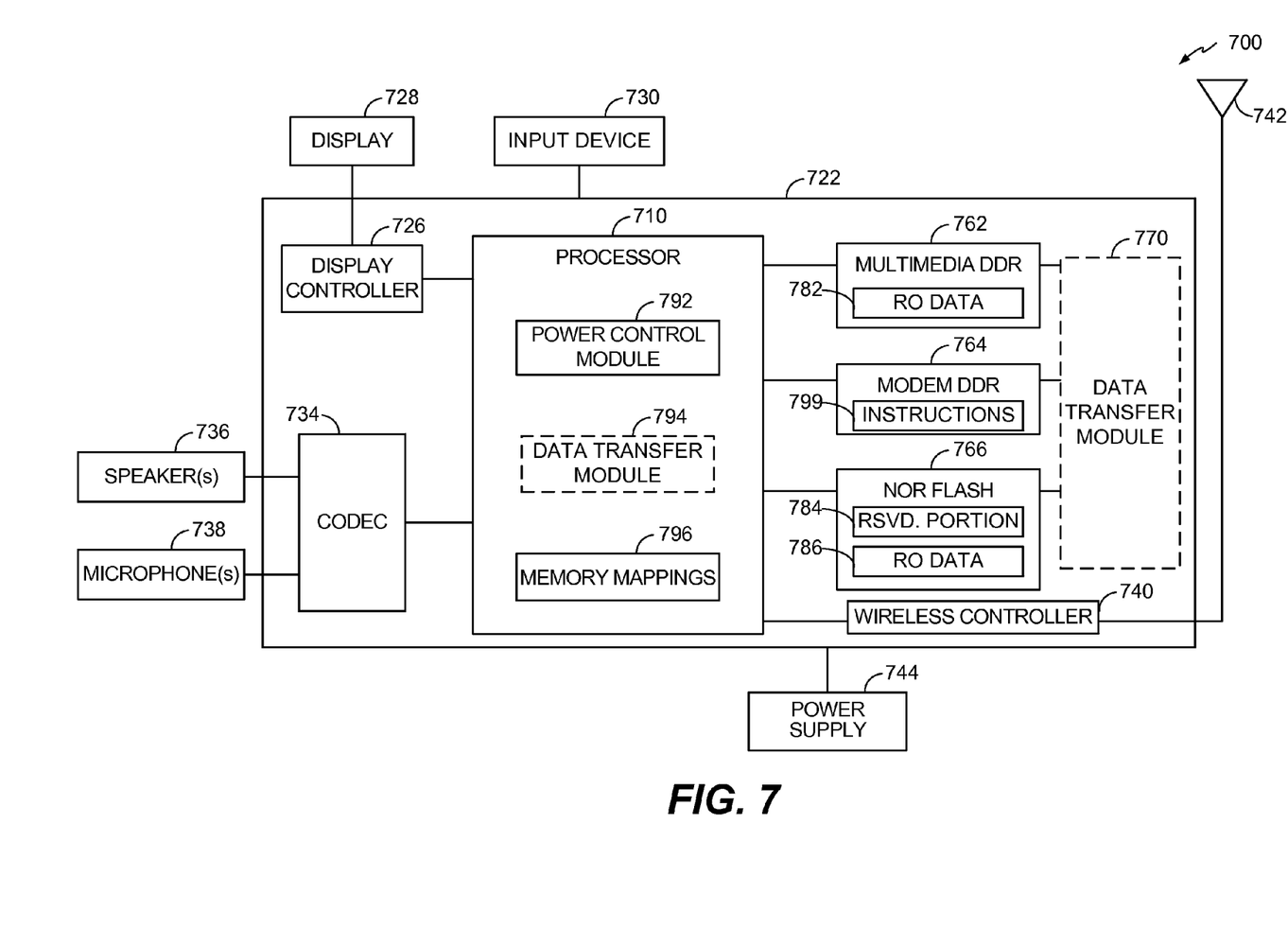
FIG. 7 is a block diagram of a communication device including components operable to reduce power consumption of volatile memory via use of non-volatile memory.

The electronic device 700 includes a processor 710 coupled to volatile memory device(s) and to non-volatile memory device(s). For example, the volatile memory device (s) may include a multimedia DDR 762 (e.g., the first volatile memory device 104 of FIGS. 1-2, the RAM 310 of FIG. 3, and/or the SDRAM 402 of FIG. 4) and a modem DDR 764 (e.g., the second volatile memory device 112 of FIG. 1, the RAM 310 of FIG. 3, and/or the SDRAM 402 of FIG. 4). The non-volatile memory device(s) may include a NOR flash memory 766 (e.g., the non-volatile memory device 108 of FIG. 102, the disk 320 of FIG. 3, and/or the NOR flash memory 404 of FIG. 4). The multimedia DDR 762 may include a first copy 782 of read-only data and the NOR flash memory 766 may include a second copy 786 of the read-only data, as shown. The NOR flash memory 766 may also include a portion 784 that is reserved for data transfers from the multimedia DDR 762 and/or the modem DDR 764. Although two volatile memory devices and one non-volatile memory device are shown in FIG. 7, it should be noted that other configurations having a different number of volatile and/or non-volatile memory device(s) may also be used.

The processor 710 may include a power control module 792 and memory mappings 796 (e.g., the memory mappings 330 of FIG. 3 and/or the memory mappings 440 of FIG. 4). In a particular embodiment, the processor 710 may include or implement a data transfer module 794 (e.g., the data transfer module 206 of FIG. 2 configured to perform processor-assisted data transfer). Alternately, or in addition, a data transfer module 770 (e.g., the data transfer module 106 of FIG. 1 configured to perform processor-independent data transfer) may be coupled to the multimedia DDR 762, the modem DDR 764, and/or the NOR flash memory 766, as shown.

During operation, the electronic device 700 may perform various functions and methods described herein, such as the methods of FIGS. 5-6. In a particular embodiment, such functionality may be implemented using hardware. Alternately, or in addition, such functionality may be implemented using instructions that are stored in a tangible non-transitory medium (e.g., the multimedia DDR 762, the modem DDR 764, and the NOR flash memory 766) and that are executable by the processor 710. For example, such functionality may be implemented using instructions 799, illustrated in FIG. 7 as being stored in the modem DDR 764.

For example, the power control module 792 may initiate a transition to sleep mode at the electronic device 700. In response to initiating the sleep mode, the data transfer module 770 or the data transfer module 794 may copy data from the multimedia DDR 762 to the reserved portion 784 of the NOR flash memory 766. Data in the modem DDR 764 (e.g., "critical" data) may not be copied. The power control module 792 may disable the multimedia DDR 762 while leaving the modem DDR 764 enabled. Subsequently, the power control module 792 may initiate a transition out of the sleep mode. The data may be copied from the reserved portion 784 of the NOR flash memory 766 to the multimedia DDR 762. The data may be copied to and from the NOR flash memory 766 in order by address, so that the memory mappings 796 remain valid.

As another example, the power control module 792 may detect a LPM condition. In response, the memory mappings 796 may be updated such that access requests for certain read-only data during the LPM are directed to the second copy 786 stored in the NOR flash memory 766 instead of to the first copy 782 stored in the multimedia DDR 762. The multimedia DDR 762 may be disabled during the LPM. When the power control module 792 detects that the LPM condition is no longer satisfied, the read-only data may be copied to the multimedia DDR 762 and the memory mappings 796 may be updated.

FIG. 7 includes a display controller 726 that is coupled to the processor 710 and to a display 728. A coder/decoder (CODEC) 734 may be coupled to the processor 710. One or more speakers 736 and microphones 738 can be coupled to the CODEC 734. FIG. 7 also indicates that a wireless controller 740 can be coupled to the processor 710 and to an antenna 742 (e.g., via a radio frequency (RF) interface).

In a particular embodiment, the processor 710, the display controller 726, the multimedia DDR 762, the modem DDR 764, the NOR flash memory 766, the CODEC 734, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker(s) 736, the microphone(s) 738, the antenna 742, and the power supply 744 are external to the system-on-chip device 722. However, each of the display 728, the input device 730, the speaker 736, the microphone 738, the antenna 742, and the power supply 744 can be coupled to a component of the system-on-chip device 722, such as an interface or a controller.

In conjunction with the described embodiments, an apparatus may include a volatile memory device having a first size, a non-volatile memory device having a second size, and a processor. The processor may be configured to initiate a transition from an operating mode to a sleep mode and to disable the volatile memory device during the sleep mode. The apparatus may also include means for copying data from the volatile memory device to the non-volatile memory device in response to the initiating and prior to the disabling of the volatile memory device during the sleep mode. For example, the means for copying may include the data transfer module 106 of FIG. 1, the data transfer module 206 of FIG. 2, the data transfer module 770 of FIG. 7, the data transfer module 794 of FIG. 7, one or more other devices or modules configured to copy data, or any combination thereof.

Another apparatus may include a volatile memory device storing a first copy of read-only data and a non-volatile memory device storing a second copy of the read-only data. The apparatus may include means for updating, in response to a LPM condition being satisfied, a memory mapping of the read-only data from the volatile memory device to the non-volatile memory device. For example, the means for updating may include the processor 102 of FIGS. 1-2, the processor 710 of FIG. 7, one or more other devices or modules (e.g., a memory controller, a memory management unit (MMU), etc.) configured to update memory mappings, or any combination thereof.

The apparatus may further include means for disabling a portion of the volatile memory device that stores the first copy of the read-only data. For example, the means for disabling may include the power control module 792 of FIG. 7, one or more other devices or modules configured to disable a portion of a volatile memory device, or any combination thereof.

The apparatus may include means for directing an access request for the read-only data to the non-volatile memory device instead of to the volatile memory device. For example, the means for directing may include the processor 102 of FIGS. 1-2, the processor 710 of FIG. 7, one or more other devices or modules (e.g., a memory controller, a MMU, etc.) configured to direct memory accesses, or any combination thereof.

The apparatus may also include means for determining that the LPM condition is satisfied. For example, the means for determining may include the power control module 792 of FIG. 7, one or more other devices or modules configured to determine whether a LPM condition is satisfied, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
loading application data into a volatile memory device of a mobile electronic device in an operating mode, the mobile electronic device comprising the volatile memory device having a first size and a non-volatile memory device having a second size that is greater than or equal to the first size, the volatile memory device including higher-priority volatile memory associated with critical data including data associated with an unlock screen of the mobile electronic device and lower-priority volatile memory associated with multimedia data, the higher-priority volatile memory configured to remain enabled during a sleep mode and the lower-priority volatile memory configured to be disabled during the sleep mode;
initiating a transition from the operating mode to the sleep mode at the mobile electronic device;
in response to the initiating, copying the application data from the lower-priority volatile memory to the non-volatile memory device;
disabling the lower-priority volatile memory of the volatile memory device during the sleep mode;
maintaining the data associated with the unlock screen of the mobile electronic device in the higher-priority volatile memory so that the mobile electronic device is responsive to user input when initiating another transition from the sleep mode to the operating mode;
initiating the other another transition from the sleep mode to the operating mode at the mobile electronic device;
enabling the lower-priority volatile memory; and
in response to the initiating of the other transition other initiating, copying the application data from the non-volatile memory device to the lower-priority volatile memory.

2. The method of claim 1, wherein disabling the lower-priority volatile memory comprises turning off power to the lower-priority volatile memory.

3. The method of claim 1, wherein the volatile memory device comprises a dynamic random access memory (DRAM).

4. The method of claim 1, wherein disabling the lower-priority volatile memory comprises disabling refreshing of the lower-priority volatile memory during the sleep mode.

5. The method of claim 3, wherein the DRAM comprises a double data rate (DDR) synchronous DRAM (SDRAM).

6. The method of claim 3, wherein the non-volatile memory device comprises NOR Flash memory, NAND Flash memory, an embedded MultiMediaCard (eMMC), or any combination thereof.

7. The method of claim 1, wherein a memory mapping associated with the application data prior to copying the application data to the non-volatile memory device remains valid after the application data is copied from the non-volatile memory device to the volatile memory device.

8. The method of claim 1, wherein a data element copied from a particular location of the volatile memory device is copied from the nonvolatile memory device to the particular location of the volatile memory device after enabling the lower-priority volatile memory.

9. The method of claim 1, wherein the application data comprises both the critical data and the multimedia data and wherein the critical data of the application data is allocated to the higher-priority volatile memory and the multimedia data of the application data is allocated to the lower-priority volatile memory.

10. The method of claim 1, wherein the application data is loaded into the volatile memory device according to an application specification and wherein the application specification is specified by an application developer or a user to allocate storage of the application data in either the higher-priority volatile memory or the lower-priority volatile memory.

11. The method of claim 10, wherein the application setting is configured through an application programming interface, a compiler, a linker, or a graphical user interface.

12. The method of claim 10, wherein the application data comprises modem data and wherein the application specification designates the application data as critical and wherein the application data is allocated to the higher-priority volatile memory.

13. The method of claim 12, wherein allocating the modem data to the higher-priority volatile memory enables the electronic device to more quickly respond to wireless cycles or paging cycles.

14. The method of claim 1, wherein the mobile electronic device comprises a mobile phone, a tablet computing device, a laptop computing device, a set-top box, a music player, a video player, an entertainment unit, a navigation device, a communications device, or a personal digital assistant.

15. A mobile electronic apparatus comprising:
a volatile memory device having a first size, the volatile memory device including higher-priority volatile memory associated with critical data including data associated with an unlock screen of the mobile electronic apparatus and lower-priority volatile memory associated with multimedia data, the higher-priority volatile memory configured to remain enabled during a sleep mode, the lower-priority volatile memory configured to be disabled during the sleep mode;
a non-volatile memory device having a second size that is greater than or equal to the first size;
a processor configured to:
load application data into the volatile memory device;
initiate a transition from an operating mode to the sleep mode;
disable the lower-priority volatile memory during the sleep mode;
maintain the data associated with the unlock screen of the mobile electronic apparatus in the higher-priority volatile memory so that the mobile electronic apparatus is responsive to user input when initiating another transition to the operating mode;
initiate the other another transition from the sleep mode to the operating mode; and
enable the lower-priority volatile memory; and
a data transfer module configured to copy the application data from the volatile memory device to the non-volatile memory device in response to the initiating of the transition and prior to the disabling of the lower-priority volatile memory during the sleep mode and further configured to copy the application data from the non-volatile memory device to the lower-priority volatile memory in response to enabling the lower-priority volatile memory when transitioning from the sleep mode to the operating mode.

16. The mobile electronic apparatus of claim 15, wherein the data transfer module comprises hardware that is coupled to the volatile memory device and to the non-volatile memory device and that is configured to copy the application data from the volatile memory device to the non-volatile memory device without sending the application data to the processor and to copy the application data from the non-volatile memory device to the volatile memory device without sending the application data to the processor.

17. The mobile electronic apparatus of claim 15, wherein the data transfer module is integrated into the processor, executable by the processor, or any combination thereof.

18. The mobile electronic apparatus of claim 17, wherein the data transfer module is configured to copy the application data from the volatile memory device to the non-volatile memory device via the processor and to copy the application data from the non-volatile memory device to the volatile memory device via the processor.

19. A non-transient storage medium comprising instructions that, when executed by a processor, cause the processor to:
load application data into a volatile memory device of a mobile electronic device in an operating mode, the mobile electronic device comprising the volatile memory device having a first size and a non-volatile memory device having a second size that is greater than or equal to the first size, the volatile memory device including higher-priority volatile memory associated with critical data including data associated with an unlock screen of the mobile electronic device and lower-priority volatile memory associated with multimedia data, the higher-priority volatile memory configured to remain enabled during a sleep mode and the lower-priority volatile memory configured to be disabled during the sleep mode;
initiate a transition from the operating mode to the sleep mode at the mobile electronic device;
in response to the initiating, cause copying of the application data from the lower-priority volatile memory to the non-volatile memory device;
disable the lower-priority volatile memory during the sleep mode;
maintain the data associated with unlock screen of the mobile electronic device in the higher-priority volatile memory so that the mobile electronic device is responsive to user input when initiating another transition from the sleep mode to the operating mode;
initiate the other another transition from the sleep mode to the operating mode;
enable the lower-priority volatile memory; and
in response to the initiating the other transition from the sleep mode to the operating mode, cause the copying of the application data from the non-volatile memory device to the lower-priority volatile memory.

20. A mobile electronic apparatus comprising:
a volatile memory device having a first size, the volatile memory device including higher-priority volatile memory associated with critical data including data associated with an unlock screen of the mobile electronic apparatus and lower-priority volatile memory associated with multimedia data, the higher-priority volatile memory configured to remain enabled during a sleep mode, the lower-priority volatile memory configured to be disabled during the sleep mode;

a non-volatile memory device having a second size that is greater than or equal to the first size;

a processor configured to:

load application data into the volatile memory device;

initiate a transition from an operating mode to the sleep mode;

disable the lower-priority volatile memory during the sleep mode;

maintain the data associated with the unlock screen of the mobile electronic apparatus in the higher-priority volatile memory so that the mobile electronic apparatus is responsive to user input when initiating another transition from the sleep mode to the operating mode;

initiate the other another transition from the sleep mode to the operating mode; and enable the lower-priority volatile memory; and means for copying the application data from the lower-priority volatile memory to the non-volatile memory device in response to the initiating of the transition and prior to the disabling the lower-priority volatile memory during the sleep mode and for copying the application data from the non-volatile memory device to the lower-priority volatile memory in response to and after the enabling the lower-priority volatile memory when transitioning to the operating mode.

* * * * *

UNITED STATES PATENT AND TRADEMARK OFFICE
CERTIFICATE OF CORRECTION

PATENT NO. : 9,891,694 B2  
APPLICATION NO. : 13/726066  
DATED : February 13, 2018  
INVENTOR(S) : Ali Taha et al.

Page 1 of 1

It is certified that error appears in the above-identified patent and that said Letters Patent is hereby corrected as shown below:

In the Claims

Column 17, Line 5, after "the" before "memory" delete "nonvolatile" insert --non-volatile--

Column 18, Line 13 and 14, after "the" before "memory" delete "nonvolatile" insert --non-volatile--

Signed and Sealed this  
Third Day of April, 2018

Andrei Iancu  
*Director of the United States Patent and Trademark Office*